UNITED STATES PATENT OFFICE.

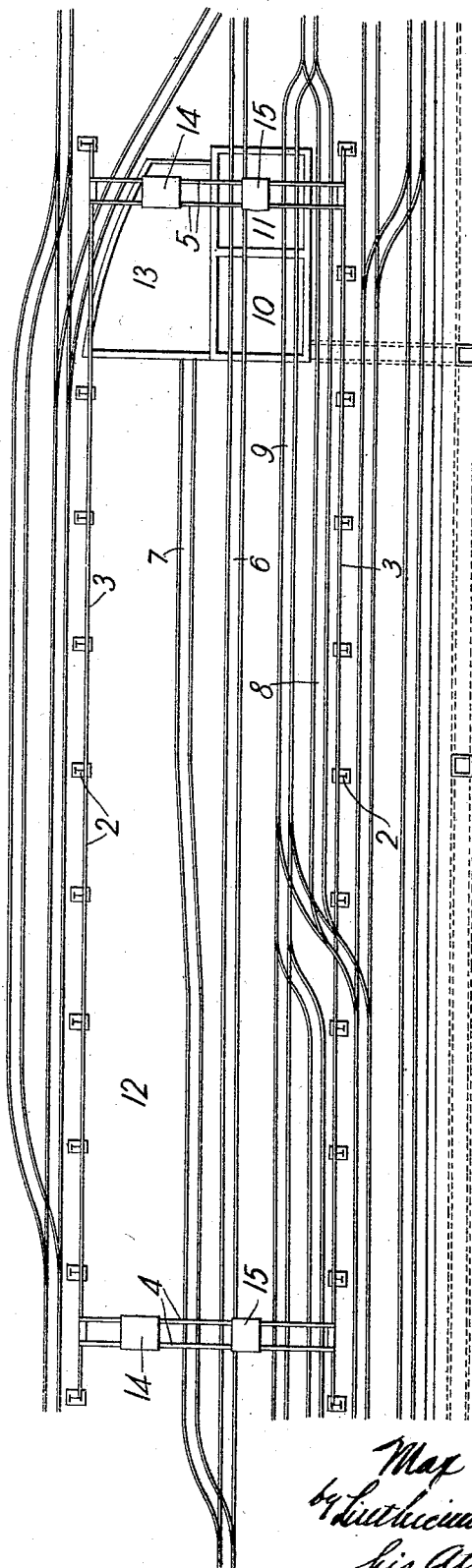

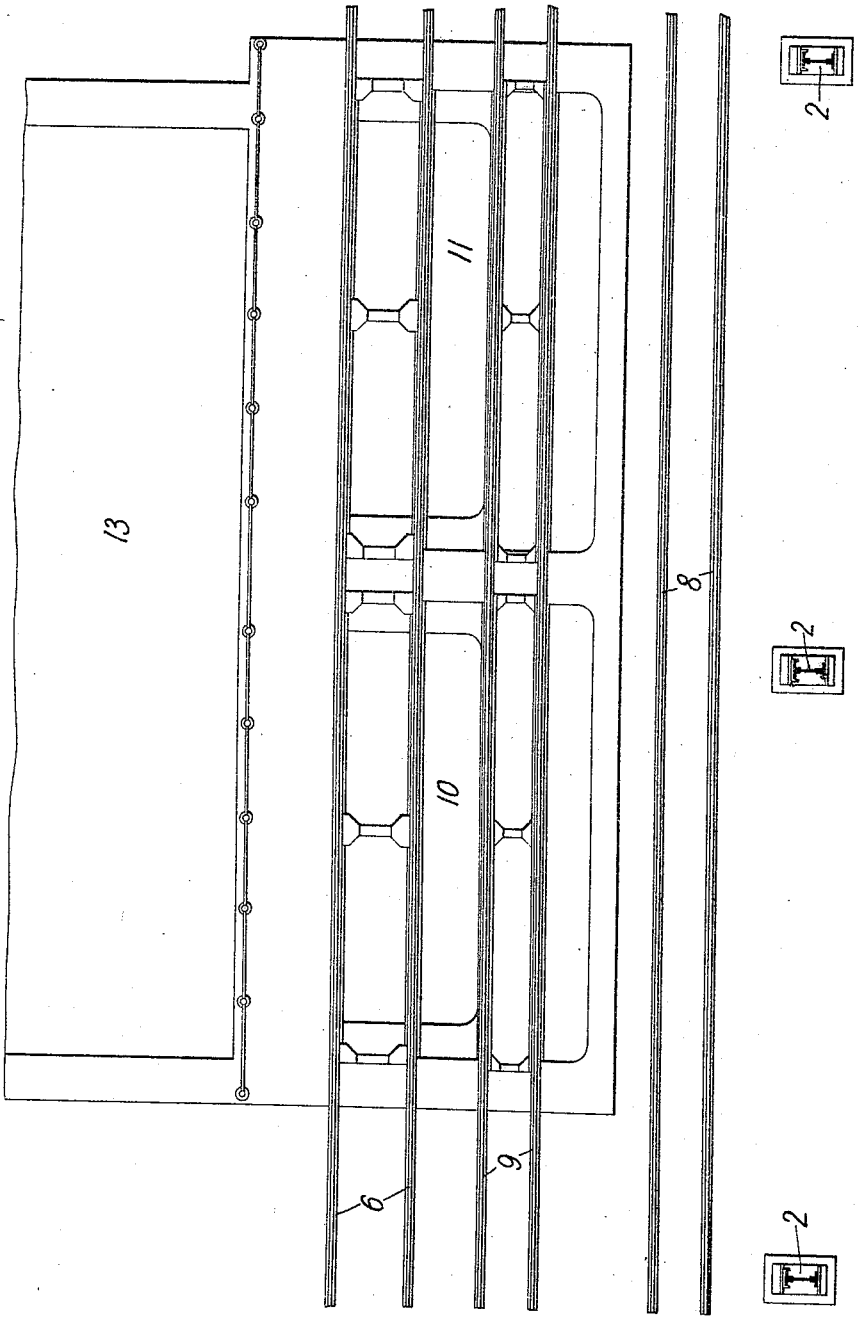

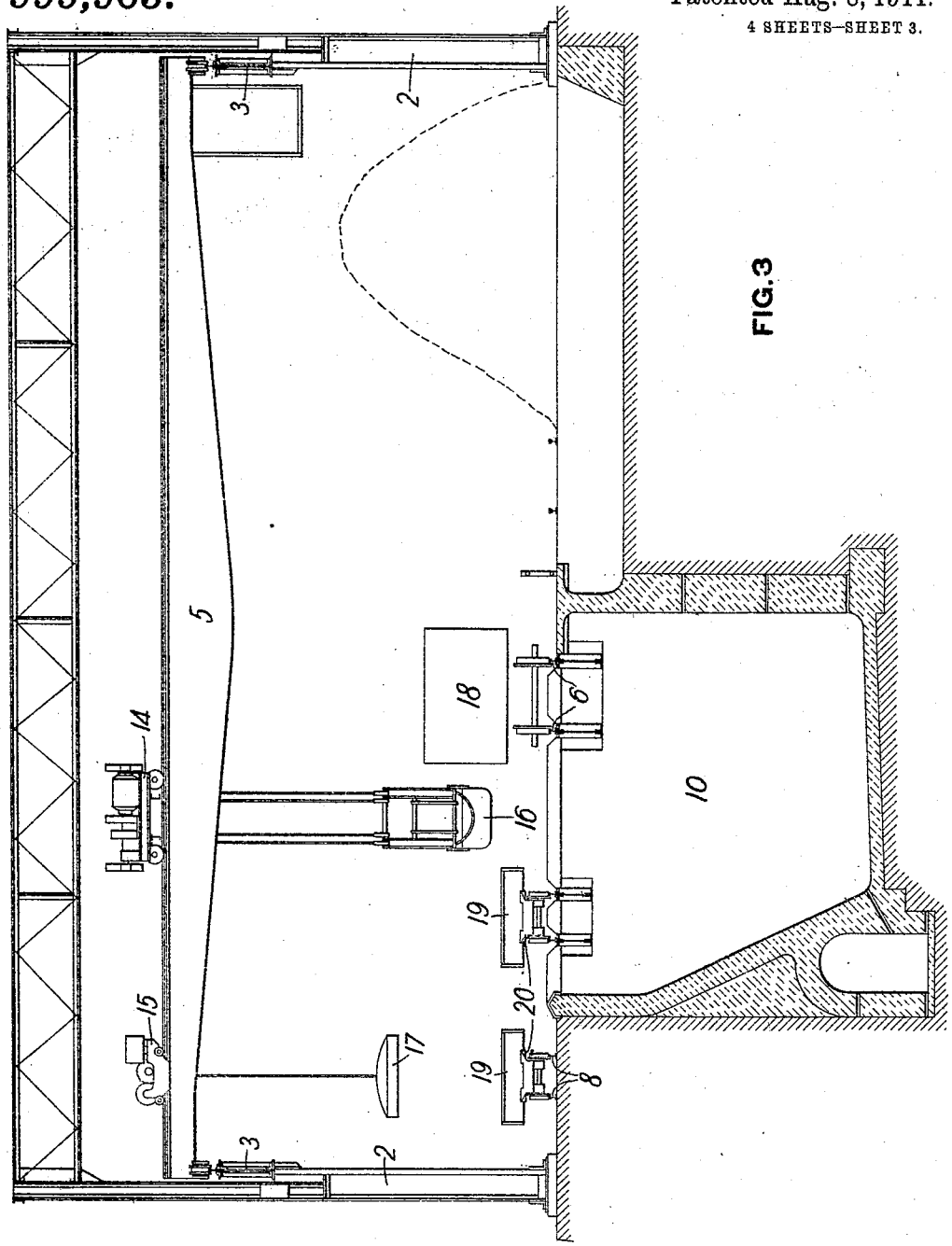

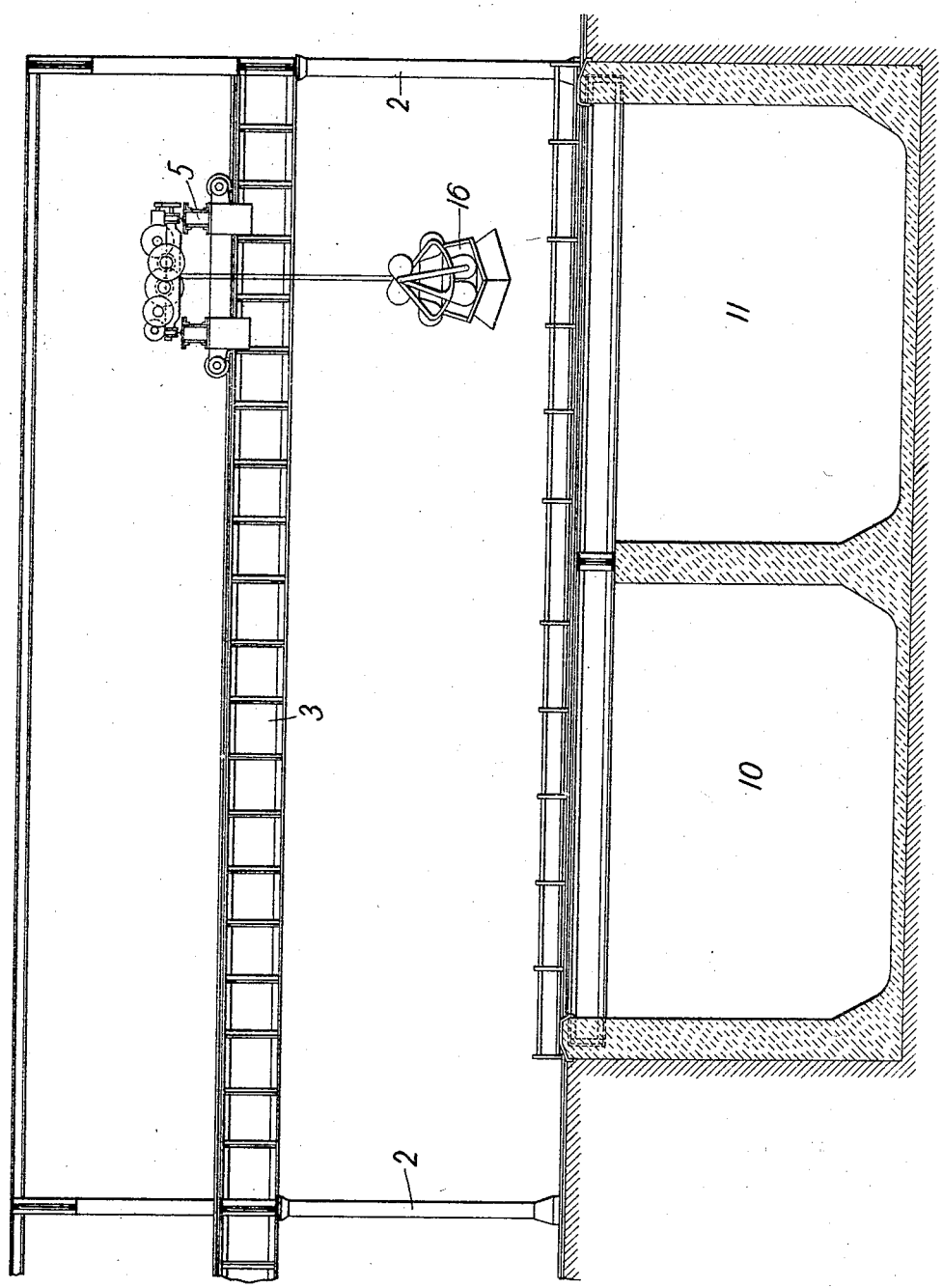

MAX M. SUPPES, OF ELYRIA, OHIO.

METHOD OF HANDLING STOCK.

999,905.  Specification of Letters Patent.  Patented Aug. 8, 1911.

Application filed May 9, 1911. Serial No. 626,100.

*To all whom it may concern:*

Be it known that I, MAX M. SUPPES, of Elyria, in the county of Lorain and State of Ohio, have invented certain new and useful Improvements in Methods of Handling Stock, of which the following is a full, clear, and exact description, reference being had to the accompanying drawings, forming part of this specification.
My invention relates to handling the raw materials used in the manufacture of open hearth steel and similar reducing operations, and the invention is designed to provide an improved method of handling such materials in or during the loading and unloading operations found necessary in transferring the raw materials to and from the stock pile of the storage yard and into and out of the cars, furnace, charging boxes or other receptacles into which the materials are placed for transfer to the furnaces of an open hearth plant or other place of use.

Heretofore, in handling raw materials such as ore, limestone and metal scrap used in the manufacture of steel, a large part of the materials is unavoidably spilled during the loading and unloading operations and the spilled materials become scattered upon and around the loading and unloading tracks to such an extent as to seriously interfere with the shifting operations necessary in placing and removing the cars or other carriers constantly being loaded and unloaded. The necessary removal of such spilled materials, which when dropped become scattered over a considerable area, is the cause of frequent delays in the operation of unloading and reloading the carriers, and the source of considerable expense, the expense entailed in continually collecting and rehandling the spilled and scattered materials forming the greater portion of the cost of handling and rehandling the stock charged into the furnaces.
One object of my invention is to provide a novel method of handling such materials in bulk whereby all of the materials spilled in the loading and unloading operations are caused to be collected and assembled together and into position to be again handled in bulk without the necessity of collecting the spilled materials so as to permit of being rehandled.

Another object of this invention is to provide an improved method of handling the raw materials forming the stock charged into open hearth and similar furnaces whereby the materials are handled and rehandled in a manner causing the materials unavoidably spilled in the handling operations to be collected and assembled in position to be again handled and to provide a method of handling the materials in bulk in loading the charging boxes used in charging open hearth furnaces with the metallic and non-metallic portions of such materials.

A still further object of this invention is to provide a novel method of separating the magnetic and non-magnetic materials from the spilled materials when collected together and separately loading such materials in bulk in the open hearth furnace charging boxes.

Referring to the drawings, Figure 1 is a plan showing one arrangement of a storage yard having loading tracks and bins adapted for use in carrying out my improved method. Fig. 2 is a plan of a portion of the same on an enlarged scale showing a system of loading tracks and pits located within the rectangle formed by the crane runway as preferably arranged for use in carrying out the steps of my improved method. Fig. 3 is a sectional end elevation of the storage yard and yard equipment shown in Figs. 1 and 2. Fig. 4 is a sectional side elevation of the same.

In the accompanying drawings, 2 designates columns supporting the girders 3 of a crane runway. Mounted upon the track rails of the crane runway are traveling cranes 4 and 5 arranged to span a storage yard equipped with standard gage tracks 6 and 7, and narrow gage tracks 8 and 9, the track 6 and narrow gage track 9 being arranged so as to extend over loading pits 10 and 11, for a purpose more fully described hereinafter. Spaces 12 and 13 are provided within the storage yard, which are used to store the large quantity of the materials usually stocked in the yard, and, when desired, to transfer materials to and from the stock storage pile to cars or other carriers and vice versa.

The narrow gage tracks 8 and 9 are connected together by suitable switches so as to afford facilities for shifting the narrow gage cars or other carriers employed from one track to another, and the broad gage tracks 6 and 7 also are connected together (as shown, at a point without the storage yard) by suitably located switches, in order to transfer the broad gage cars from one track to another.

Each of the cranes 4 and 5 is provided with at least two trolleys 14 and 15, the trolleys 14 having suspended therefrom a grab bucket 16, which may be of the clam shell, orange peel, or other desired type, adapted for use in handling the class of materials stored in the storage yard. The trolleys 15 are provided with a lifting magnet 17 suspended therefrom by means of which the metal portions of the stock stored in the storage yard are handled and are separated from the non-metallic materials.

Located at a suitable point within the rectangle formed by the crane runways are pits 10 and 11, constructed to receive and collect materials dropped or spilled by the unloading devices suspended from the crane trolleys, in removing materials from the cars and in reloading the materials from the stock pile into the cars or other carriers by which the materials are conveyed to a place of use.

In carrying out my improved method with apparatus like that shown in the drawings, in handling and rehandling the large quantities of raw materials used in making steel in an open hearth plant, the raw materials are received in cars 18, which, when to be unloaded are shifted into position above one or the other of the pits 10 and 11. One or the other of the grab buckets 16, which are suspended from the trolley 14 on the traveling cranes 4 or 5, is used to handle in bulk the non-magnetic materials, such as ore, limestone, dolomite, and refractories used in the operation of open hearth plants, and one of the lifting magnets 17 suspended from the auxiliary trolley 15 on one or the other of the cranes, is employed to load and unload the metallic or magnetic materials used in such open hearth plants, such as mill scrap, pig iron, and similar materials. In unloading the broad gage cars 18 the materials are either transferred direct to charging boxes 19 on the narrow gage cars 20, which in such case are located on the track 9 in position above the pits 10 and 11 while being filled, or the materials in the cars 18 may be unloaded and stored for future use in the stock pile or piles maintained in the storage yard and when materials are being loaded into the charging boxes 19 from the stock pile, the cars supporting the boxes 19 are placed in position on the track 9 above the unloading pits 10 and 11. By loading materials into and taking materials out of the cars, and by filling charging boxes or other carriers, while the cars or carriers are located above the loading pits, the materials dropped or spilled by the grab buckets or by the magnet fall into one or the other of the pits 10 or 11, and by reason of the sloping or inclined construction of the side walls of these pits, materials dropping into the pits are directed and caused to be delivered or collected at a suitable point in the pit, in position to be picked up and hoisted in bulk out of the pit by the grab bucket or the lifting magnet and be deposited in bulk within the car or charging box or other receptacle in which the materials are being loaded. The large quantities of materials spilled by the grab buckets and by the magnet in handling and rehandling are caused to fall or drop into the unloading pits and to be directed by gravity into a pile or heap in position to be lifted from the pit, so that the necessity for collecting together and removing the spilled materials from the car tracks and from about the tracks, is overcome, clogging of the tracks prevented, and interference with the operations of shifting the cars is avoided and the loading and unloading operations thereby greatly facilitated.

By locating the cars or other carriers above the pit while being filled or emptied, the spilled materials do not drop upon the track, and, instead of becoming scattered over a comparatively large space or area about the loading and unloading tracks, the spilled materials are caused to collect and be assembled within the pit into position to be quickly removed in bulk by the grab bucket or lifting magnet. The magnetic or metallic materials are readily separated from the non-magnetic materials by employing the lifting magnet to remove them from the collection of spilled materials in the pit, and after the removal of the metallic or magnetic materials, the remaining non-metallic materials can then be removed by means of the grab bucket, or when desired the grab bucket may be employed to remove the mixture of metallic and non-metallic materials as collected in these pits.

I claim:—

1. The method of handling stock for metallurgical furnaces consisting in transferring the materials forming the stock in bulk into carriers, and causing materials spilled in transferring to collect in a heap into position to be again lifted and transferred in bulk into the carriers.

2. The method of handling stock for metallurgical furnaces consisting in transferring the materials forming the stock in bulk into carriers, causing materials spilled in transferring to collect in a heap, and removing the materials in bulk from the so-formed heap.

3. The method of handling stock for metallurgical furnaces consisting in transferring the metallic and non-metallic materials forming the stock into carriers in bulk, causing materials spilled in transferring to collect in a heap and separating the metallic and non-metallic materials in the heap by employing a lifting magnet to remove the magnetic portions of the heap.

4. The method of handling stock for metallurgical furnaces consisting in loading the materials in bulk into charging boxes placed above a collecting pit, whereby materials spilled in loading the boxes are collected in position to be again lifted in bulk from said pit, and then removing the so collected materials.

5. The method of handling stock for metallurgical furnaces consisting in loading the metallic and non-metallic materials in bulk into charging boxes placed above a collecting pit, whereby materials spilled in loading the boxes are deposited in position to be again lifted in bulk from said pit, and employing a lifting magnet to handle the spilled metallic materials to separate the metallic from the non-metallic portions of spilled materials deposited in the collecting pit.

In testimony whereof, I have hereunto set my hand.

MAX M. SUPPES.

Witnesses:
F. W. WATERMAN,
D. W. LAWRENCE.

Copies of this patent may be obtained for five cents each, by addressing the "Commissioner of Patents, Washington, D. C."